(12) United States Patent
Masuo et al.

(10) Patent No.: US 8,583,859 B2
(45) Date of Patent: Nov. 12, 2013

(54) STORAGE CONTROLLER FOR WEAR-LEVELING AND COMPACTION AND METHOD OF CONTROLLING THEREOF

(75) Inventors: Yoko Masuo, Iruma (JP); Hironobu Miyamoto, Yokohama (JP); Wataru Okamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 13/154,203

(22) Filed: Jun. 6, 2011

(65) Prior Publication Data
US 2012/0054418 A1  Mar. 1, 2012

(30) Foreign Application Priority Data

Aug. 31, 2010  (JP) .................................. 2010-194040

(51) Int. Cl.
*G06F 12/16* (2006.01)
(52) U.S. Cl.
USPC ............................ 711/103; 711/156; 711/165
(58) Field of Classification Search
USPC ......................................... 711/103, 156, 165
See application file for complete search history.

(56) References Cited

U.S. PATENT DOCUMENTS

| | | | |
|---|---|---|---|
| 5,341,339 | A | 8/1994 | Wells |
| 7,315,917 | B2 | 1/2008 | Bennett et al. |
| 7,565,478 | B2 | 7/2009 | Bennett et al. |
| 2006/0161724 | A1 | 7/2006 | Bennett et al. |
| 2006/0161728 | A1 | 7/2006 | Bennett et al. |
| 2008/0091872 | A1 | 4/2008 | Bennett et al. |
| 2009/0265508 | A1 | 10/2009 | Bennett et al. |
| 2011/0271030 | A1* | 11/2011 | Iaculo et al. ................... 711/102 |
| 2012/0317345 | A1* | 12/2012 | Pan et al. ....................... 711/103 |

FOREIGN PATENT DOCUMENTS

| | | |
|---|---|---|
| JP | H11-3287 | 1/1999 |
| JP | 2002-032256 A2 | 1/2002 |
| JP | 3641280 B2 | 4/2005 |
| JP | 2005-275722 A2 | 10/2005 |
| JP | 3812933 B2 | 8/2006 |
| JP | 2009-282989 A2 | 12/2009 |

OTHER PUBLICATIONS

Japanese Office Action for Application JP 2010-194040, mailed Aug. 30, 2011.

* cited by examiner

*Primary Examiner* — John Lane
(74) *Attorney, Agent, or Firm* — Knobbe Martens Olson & Bear LLP

(57) ABSTRACT

According to one embodiment, a storage controller includes a condition storage, a determination module, a wear-leveling block retainer, and a data transfer controller. The condition storage is provided in a storage including a plurality of blocks, and stores block condition information including at least one of erasure time information indicating when data is erased last time and erasure count information indicating the number of times data is erased. The determination module determines whether there is a block that requires wear leveling based on the block condition information. The wear-leveling block retainer retains block identification information that identifies a block determined to require wear leveling. The data transfer controller performs compaction to transfer data stored in blocks of the storage for collecting the data in a block, and, when the block identification information is retained, transfers data stored in the block identified by the block identification information.

8 Claims, 9 Drawing Sheets

FIG.3

| BLOCK ID | ERASURE COUNT | ERASURE SEQUENCE NUMBER |
|---|---|---|
| ... | ... | ... |
| ... | ... | ... |
| ... | ... | ... |
| ... | ... | ... |
| ... | ... | ... |

STORAGE CONTROLLER FOR WEAR-LEVELING AND COMPACTION AND METHOD OF CONTROLLING THEREOF

CROSS-REFERENCE TO RELATED APPLICATIONS

This application is based upon and claims the benefit of priority from Japanese Patent Application No. 2010-194040, filed Aug. 31, 2010, the entire contents of which are incorporated herein by reference.

FIELD

Embodiments described herein relate generally to a storage controller, a storage device, and a data transfer control method.

BACKGROUND

There have been proposed various storage devices for terminal devices. Among such storage devices is, for example, a flash memory. In recent years, a type of flash memory called NAND flash memory has been increasingly used.

The NAND flash memory is a nonvolatile semiconductor memory that needs to be erased before new data is written. The life depends on the number of times of erasure and erasure time intervals. It is preferable to equally use the blocks to prolong the life of the NAND flash memory.

In view of this, wear leveling techniques have recently been proposed. In the wear leveling techniques, erasure time and the number of times of erasure are measured with respect to each block as the minimum unit of data erasure. Then, data in a block being used and least recently erased is transferred to a free block which has been erased more number of times than the block in use by a predetermined value or more. With this, the blocks are equally exhausted.

In the NAND flash memory in which data is written to each logical sector and erased from each block formed of a plurality of logical sectors, as rewriting is performed, the block contains a logical sector that stores invalid data and a logical sector that stores valid data, i.e., some free space exists in the block. To effectively use the storage area, compaction is performed in which the latest effective data are collected from low-density blocks and rewritten to another block.

In conventional technologies, although wear leveling and compaction are similar in that both are techniques to transfer data, they are performed independently. This results in a redundant configuration and heavier burden in development or the like.

SUMMARY

Without limiting the scope of this invention as expressed by the claims which follow, some features are discussed briefly below.

One aspect of the disclosure provides a storage controller for a storage. The storage includes a plurality of blocks in units of which data is erased. The blocks are configured to store data. The storage controller includes a condition storage configured to store, with respect to each of the plurality of blocks, block condition information including at least one of erasure time information indicative of a latest time of data erasure and erasure count information indicative of a number of times data has been erased from the block. The storage controller further includes a determination module configured to determine whether to perform wear leveling on each of the plurality of blocks, based on the block condition information stored in the condition storage. The storage controller further includes a wear-leveling block retainer configured to retain block identification information indicative of a block identified for wear leveling by the determination module. The storage controller further includes a data transfer controller configured to perform compaction by collecting data stored in at least two blocks of the plurality of blocks and transferring the data into another block. The data transfer controller is further configured to transfer data stored in the block indicated in the block identification information when the wear-leveling block retainer retains block identification information. The storage controller further includes a compaction block retainer configured to retain block identification information indicative of a block to be a transfer origin when the data transfer controller performs compaction. The storage controller further includes a prevention module configured to prevent the same block identification information from being retained by the wear-leveling block retainer and the compaction block retainer at the same time. The data transfer controller is further configured to transfer the data stored in the block indicated in the block identification information retained by the wear-leveling block retainer, and to perform the compaction on blocks indicated in the block identification information retained by the compaction block retainer.

In various embodiments, the storage controller can further include a transfer destination retainer configured to retain block identification information indicative of a block to be a transfer destination in the compaction or wear leveling. The block to be a transfer destination can be empty. The data transfer controller can be further configured to transfer the data stored in the block indicated in block identification information to the block indicated in the block identification information retained by the transfer destination retainer.

In various embodiments, the transfer destination retainer can be further configured to retain the block identification information in association with the erasure count information, and provide the data transfer controller with block identification information in an order starting with block identification information that identifies a block with a largest erasure count. The data transfer controller can be configured to transfer the data stored in the block identified by the block identification information to the block indicated in the block identification information provided by the transfer destination retainer in preference to performing compaction, when the wear-leveling block retainer retains the block identification information.

In various embodiments, the storage controller can further include a registration module configured to register a block, identified by the determination module for wear leveling, as a destination of data transfer by the data transfer controller in an order starting with a block with a largest erasure count. The data transfer controller can be further configured to transfer the data stored in the block identified by the block identification information retained by the wear-leveling block retainer to the block registered by the registration module.

In various embodiments, the storage controller can further include a controller configured to write data to the blocks of the storage in response to an external request. The transfer destination retainer can be configured to provide the data transfer controller with the block identification information in an order other than a descending order of erasure count, when the data transfer controller performs the compaction or the controller performs a data write operation.

Another aspect provides a storage device including a storage. The storage includes a plurality of blocks in units of which data is erased, the blocks configured to store data. The storage device further includes a condition storage configured to store, with respect to each of the plurality of blocks, block condition information including at least one of erasure time information indicative of a latest time of erasure and erasure count information indicative of a number of times data has been erased from the block. The storage device further includes a determination module configured to determine whether to perform wear leveling on each of the plurality of blocks, based on the block condition information stored in the condition storage. The storage device further includes a wear-leveling block retainer configured to retain block identification information indicative of a block identified for wear leveling by the determination module. The storage device further includes a data transfer controller configured to perform compaction by collecting data stored in at least two blocks of the plurality of blocks and transferring the data into another block. The data transfer controller is further configured to transfer data stored in the block indicated in the block identification information when the wear-leveling block retainer retains block identification information. The storage device further includes a compaction block retainer configured to retain block identification information indicative of a block to be a transfer origin when the data transfer controller performs compaction. The storage device further includes a prevention module configured to prevent the same block identification information from being retained by the wear-leveling block retainer and the compaction block retainer at the same time. The data transfer controller is further configured to transfer the data stored in the block indicated in the block identification information retained by the wear-leveling block retainer, and to perform the compaction on blocks indicated in the block identification information retained by the compaction block retainer.

Another aspect provides a data transfer control method for a storage device. The storage device includes a condition storage in a storage with a plurality of blocks in units of which data is erased, the condition storage configured to store, with respect to each of the plurality of blocks, block condition information comprising at least one of erasure time information indicative of a latest time of data erasure and erasure count information indicative of a number of times data has been erased from the block. The method includes determining, by a determination module, a block upon which to perform wear leveling, based on the block condition information stored in the condition storage. The method further includes retaining, by a wear-leveling block retainer, block identification information indicative of the block determined by the determination module for wear leveling. The method further includes compacting, by a data transfer controller, by collecting data stored in at least two blocks of the storage and transferring the data in to another block. The method further includes transferring, by the data transfer controller, data stored in the block identified by the block identification information when the wear-leveling block retainer retains the block identification information.

In various embodiments, the method can further include retaining, by a transfer destination retainer, block identification information indicative of a block to be a transfer destination during compaction or wear leveling, wherein the block to be a transfer destination is empty. The method can further include transferring the data stored in the block indicated in block identification information to the block indicated in the block identification information retained by the transfer destination retainer.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary schematic diagram of the table structure of an active block management module in the embodiment;

DETAILED DESCRIPTION

In general, according to one embodiment, a storage controller comprises a condition storage, a determination module, a wear-leveling block retainer, and a data transfer controller. The condition storage is provided in a storage comprising a plurality of blocks in units of which data is erased. The condition storage is configured to store, with respect to each of the blocks that stores data, block condition information including at least one of erasure time information indicating when data is erased last time and erasure count information indicating the number of times data is erased from the block. The determination module is configured to determine whether there is a block that requires wear leveling based on the block condition information stored in the condition storage. The wear-leveling block retainer is configured to retain block identification information that identifies a block determined by the determination module to require wear leveling. The data transfer controller is configured to perform compaction to transfer data stored in blocks of the storage for collecting the data in a block other than the blocks. When the wear-leveling block retainer retains the block identification information, the data transfer controller transfers data stored in the block identified by the block identification information.

The following embodiments will be described as being applied to an information processor provided with a NAND flash memory as a storage device. Each functional block described in the embodiments may be implemented as software, hardware, or a combination thereof.

Figure 1:
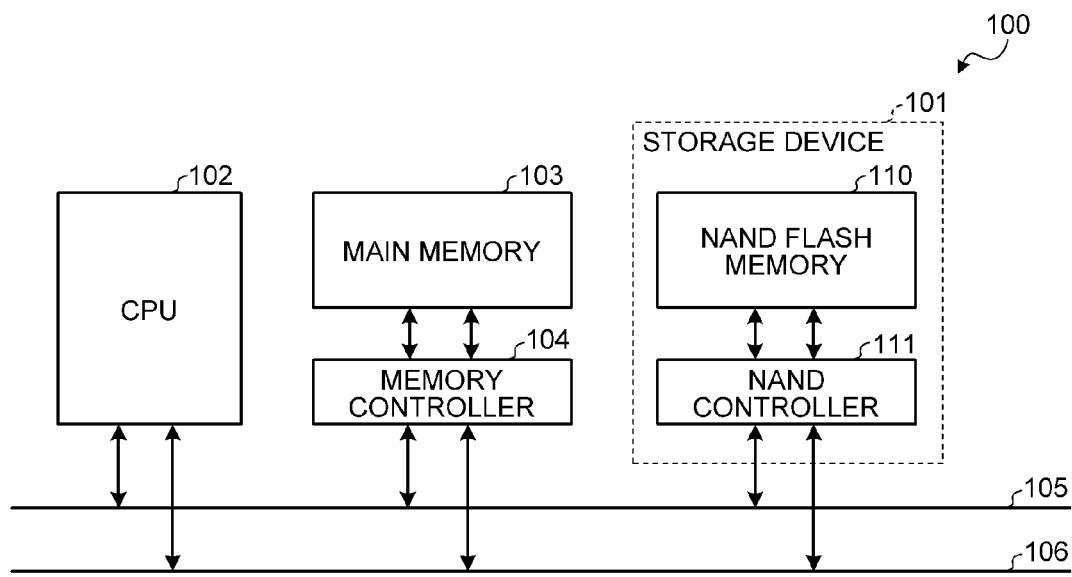
FIG. 1 is an exemplary block diagram of an information processor according to an embodiment.

FIG. 1 is a block diagram of an information processor 100 according to an embodiment. As illustrated in FIG. 1, the information processor 100 comprises a storage device 101, a central processing unit (CPU) 102, a main memory 103, and a memory controller 104. The storage device 101, the CPU 102, the main memory 103, and the memory controller 104 are interconnected by an address bus 105 for address exchange and a data bus 106 for data exchange.

The CPU 102 controls the overall operation of the information processor 100. More specifically, the CPU 102 loads a program from the storage device 101 into the main memory 103 through the memory controller 104, and controls the information processor 100 according to the program.

The memory controller 104 controls the main memory 103.

The main memory 103 may be, for example, a dynamic random access memory (DRAM). The main memory 103 is used as a work area of the CPU 102 and an area where the program is loaded.

The storage device 101 comprises a NAND flash memory 110 and a NAND controller 111. Examples of the storage device 101 include a solid state drive (SSD) provided with the NAND flash memory 110 and a system-on-chip (SoC) that makes data access to the NAND flash memory 110. In the embodiment, the storage device 101 comprises the NAND controller 111 as an example of a SoC of an SSD.

The NAND controller 111 controls the NAND flash memory 110 that is a type of nonvolatile semiconductor memory.

Data is read from/written to the NAND flash memory 110 according to a read/write request from the CPU 102 through the NAND controller 111.

The NAND flash memory 110 comprises a plurality of blocks each including a plurality of logical sectors. Data is read/written in units of logical sectors, while data is erased in units of blocks.

Figure 2:
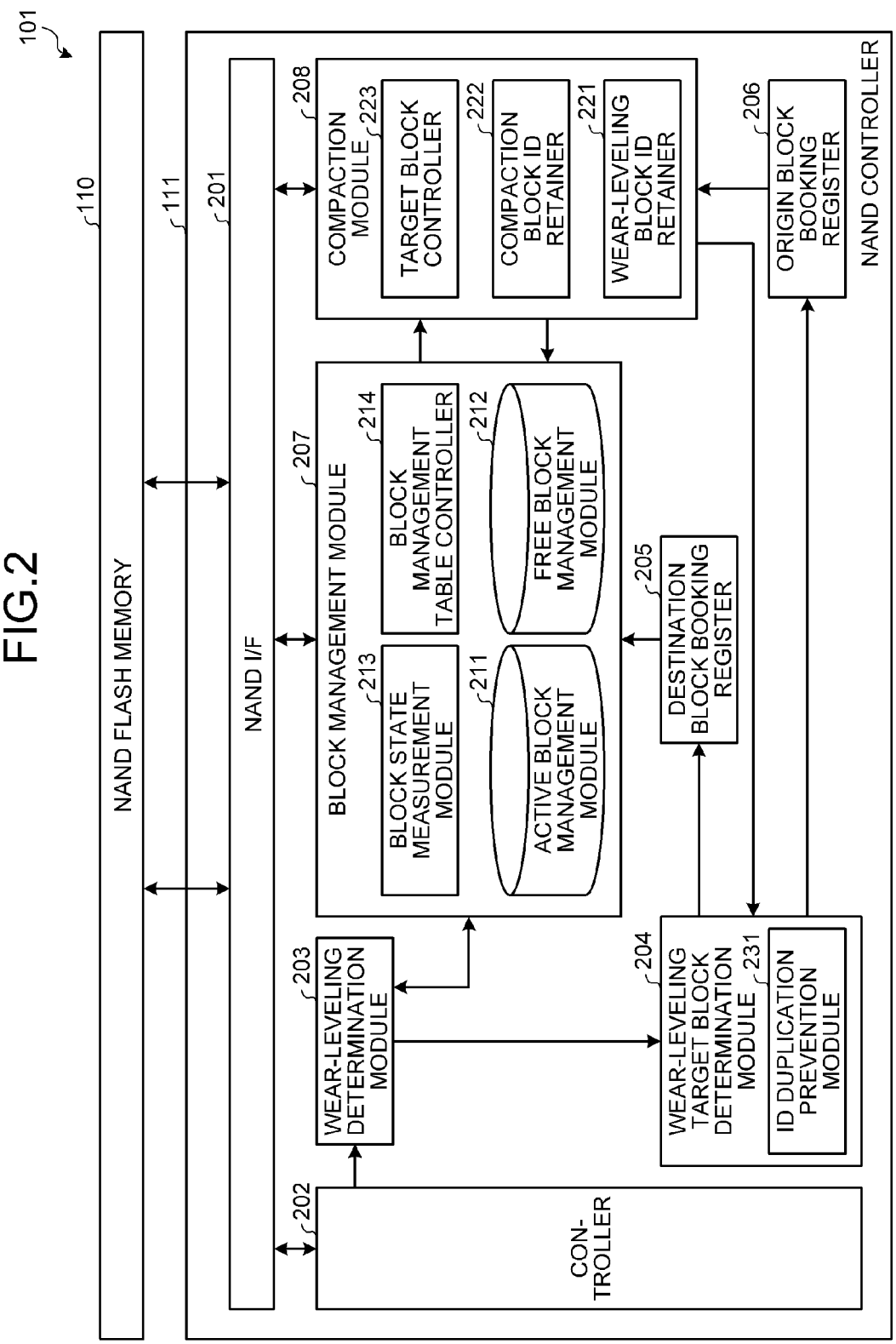
FIG. 2 is an exemplary block diagram of a storage device in the embodiment.

FIG. 2 is a block diagram of the storage device 101. As illustrated in FIG. 2, the NAND controller 111 comprises a NAND interface (I/F) 201, a controller 202, a wear-leveling determination module 203, a wear-leveling target block determination module 204, a destination block booking register 205, an origin block booking register 206, a block management module 207, and a compaction module 208.

In addition to data read/write operation in response to a request from the CPU 102, the NAND controller 111 of the embodiment controls wear leveling, compaction, and the like with respect to the NAND flash memory 110.

Compaction refers to a process to collect data stored in valid logical sectors in a low-density block when free space is caused by valid and invalid logical sectors and rewrites the data to another block. This increases available continuous memory area, thereby enabling effective use of the storage area.

Wear leveling refers to a process to transfer data in a block being used and least recently erased to a free block which has been erased more than a predetermined number of times. This is because data stored in a block being used and least recently erased may be deteriorated. By transferring the data between blocks, the deterioration is prevented. Besides, by transferring the data that is updated infrequently to a block which has been erased more than a predetermined number of times, exhaustion of blocks is equalized. In this manner, write operations are equally distributed, which prolongs the life of the NAND flash memory 110.

In a conventional NAND controller, configurations to perform wear leveling and compaction are provided independently. That is, the conventional NAND controller additionally comprises a configuration to perform wear leveling compared to the NAND controller 111 of the embodiment. If the configuration to perform wear leveling (hereinafter, "conventional wear-leveling module") and the configuration to perform compaction (hereinafter, "conventional compaction module") process the same block, unnecessary duplication of data transfer occurs.

More specifically, after selecting a block as a transfer origin according to a request from the controller or the like, the conventional compaction module is provided by the block management module with a free block as a transfer destination to transfer valid data. Meanwhile, to perform wear leveling, the conventional wear-leveling module determines whether conditions required for wear leveling are satisfied. If the conditions are satisfied, the conventional wear-leveling module selects a block that satisfies the conditions as a transfer origin block, and selects a transfer destination block to transfer valid data. Since the conventional compaction module and the conventional wear-leveling module operate independently, the duplication of data transfer occurs.

On the other hand, the NAND controller 111 of the embodiment configured as described below can control wear leveling data transfer in the compaction module 208 that performs compaction. Thus, the NAND controller 111 of the embodiment enables resources to be shared between wear leveling and compaction.

The NAND I/F 201 is an interface to access the NAND flash memory 110.

The controller 202 reads data from, writes data to, or erases data from a block of the NAND flash memory 110 via the NAND I/F 201 in response to a request from the CPU 102.

The block management module 207 comprises a block state measurement module 213, a block management table controller 214, an active block management module 211, and a free block management module 212. The block management module 207 manages the condition of each block in the NAND flash memory 110.

Each time a block is erased, the block state measurement module 213 measures data corresponding to the last erasure of the block, an erasure count, and the like. In the embodiment, an erasure sequence number is used as the data corresponding to the last erasure of data from the block.

The term "erasure sequence number" as used herein refers to a number that is assigned in ascending order to a block where data is erased. The erasure sequence number is updated each time a block is erased. That is, from a block assigned a smaller number, data is less recently erased. The term "erasure count" as used herein refers to the number of times the same block has been erased.

That is, the NAND flash memory 110 is a nonvolatile semiconductor memory that needs to be erased before new data is written. The life depends on the number of times of erasure and erasure time intervals. To prolong the life of the NAND flash memory 110, the NAND controller 111 of the embodiment measures an erasure sequence number and an erasure count for each block that is the minimum unit of data erasure by the block state measurement module 213, and controls wear leveling and the like based on the measurement results.

The block management table controller 214 controls a table that stores whether a block is being used and the measurement results obtained by the block state measurement module 213 in association with each other. The block management table controller 214 controls the active block management module 211 and the free block management module 212.

The active block management module 211 is a table that manages a block storing valid data (hereinafter, "active block"). FIG. 3 illustrates an example of the table structure of the active block management module 211. As illustrated in FIG. 3, the active block management module 211 associates block ID, erasure count, and erasure sequence number with one another. The block ID is assigned to each block to identify it. With respect to each block identified by the block ID, an erasure count and an erasure sequence number are stored in association. With this, the condition of each block can be managed.

The active block management module 211 manages all active blocks in the NAND flash memory 110. Thus, the condition of all active blocks can be figured out with reference to the active block management module 211. Although erasure count and erasure sequence number are exemplified herein as parameters to measure the condition of each block, the parameters are not limited to them. For example, a time stamp indicating data erasure time may be used as a parameter.

The free block management module 212 is a group of tables that manage a block not storing valid data (hereinafter, "free block"). That is, the free block management module 212 retains a free block to be used by the compaction module 208 or the like as a transfer destination in the process of wear leveling and compaction.

Figure 4:
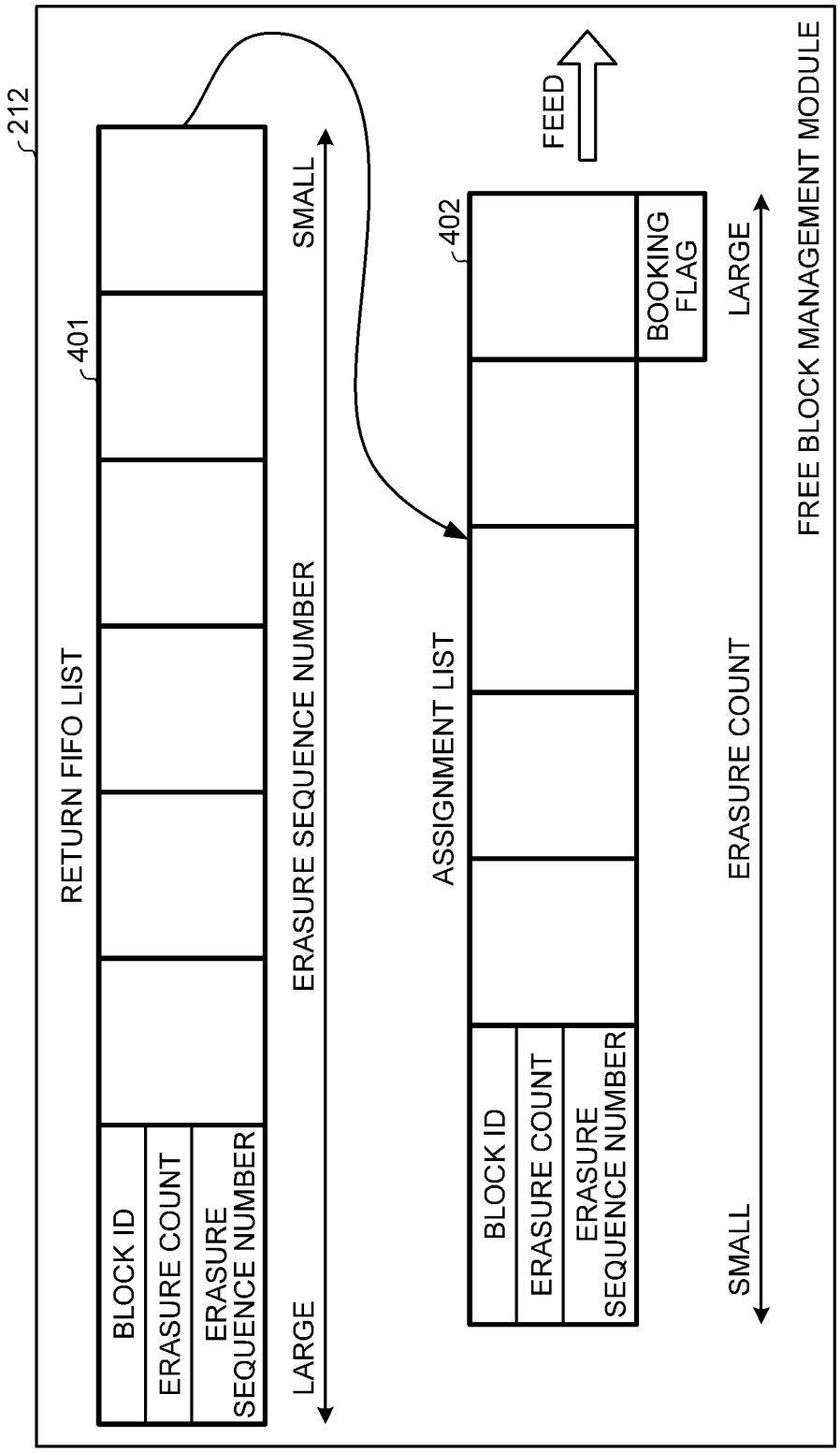
FIG. 4 is an exemplary schematic diagram of the internal structure of a group of tables in a free block management module in the embodiment.

FIG. 4 illustrates an example of the internal structure of the group of tables in the free block management module 212. As illustrated in FIG. 4, the free block management module 212 comprises a return first-in first-out (FIFO) list 401 and an assignment list 402.

The return FIFO list 401 stores a block ID that identifies a free block, an erasure count of the block, and an erasure sequence number with respect to each free block. In the return FIFO list 401, pieces of information on free blocks are arranged in ascending order of their erasure sequence numbers, i.e., listed in order from a free block least recently erased. For example, after valid data is transferred from a block by compaction or the like, the block is erased. Then, a block ID identifying the block as a free block and the like are added to the return FIFO list 401. Accordingly, the return FIFO list 401 has the function of inserting information on the free block in a position corresponding to the erasure sequence number at the time of return.

The information on the free block stored in the return FIFO list 401 is fed to the assignment list 402 each time a free block in the assignment list 402 is fed to a processor such as the compaction module 208.

The assignment list 402 is a block list for managing free blocks to be fed to a processor such as the compaction module 208 in response to a request for a free block from the processor. The assignment list 402 of the embodiment arranges pieces of information on free blocks in descending order of erasure count. The assignment list 402 has the function of inserting information on a free block in a position corresponding to the erasure count when the information is added from the return FIFO list 401. The assignment list 402 also stores, as information on a free block, a block ID, erasure count, and an erasure sequence number in association with one another with respect to each block.

The free block management module 212 sets a booking flag for the top of the assignment list 402, i.e., a free block with the largest erasure count. The booking flag indicates the presence or absence (for example, ON or OFF) of a booking. If the booking flag is ON, the free block management module 212 does not feed a free block where the booking flag is set to a processor other than the compaction module 208 and feeds the next free block where the booking flag is not set. The booking flag is set ON or OFF depending on whether wear leveling is to be performed. That is, if wear leveling is to be performed, a free block with the largest erasure count is secured. On the other hand, if wear leveling is not to be performed, the free block management module 212 feed free blocks to processors in descending order of erasure count.

While free blocks are described herein by way of example as being fed in descending order of erasure count, free blocks may be fed in ascending order of erasure count or in ascending order of erasure sequence number depending on the purpose.

The wear-leveling determination module 203 determines whether there is a block that requires wear leveling based on the condition of active blocks stored in the active block management module 211. To determine whether wear leveling is required, determination criteria are defined based on the erasure sequence number, the erasure count, and the like. As the determination criteria, already proposed criteria may be used. Alternatively, for example, if an erasure sequence number managed by the active block management module 211 is different from the current erasure sequence number by a predetermined threshold or more, a block assigned the erasure sequence number may be subjected to wear leveling as a block in which the same data remains for a long time.

The wear-leveling target block determination module 204 comprises an ID duplication prevention module 231. When the wear-leveling determination module 203 determines that wear leveling is required, the wear-leveling target block determination module 204 determines a block on which wear leveling is to be performed. The wear-leveling target block determination module 204 may determine the wear-leveling target block by any method including commonly known ones. The wear-leveling target block determination module 204 of the embodiment refers to the active block management module 211 and the free block management module 212, and scans each block list to detect a combination of an active block and a free block the erasure counts of which differ by a predetermined value or more, thereby determining the wear-leveling target block.

The ID duplication prevention module 231 refers to the block ID of an active block already determined to be subjected to compaction from a compaction block ID retainer 222. If an active block determined by the wear-leveling target block determination module 204 as a wear-leveling target block is already retained to be subjected to compaction, the ID duplication prevention module 231 nullifies the determination of the wear-leveling target block determination module 204 to prevent data transfer on the same block from being performed twice by wear leveling and compaction. While the duplication prevention process is described herein by way of example as being performed by the ID duplication prevention module 231 in the wear-leveling target block determination module 204, it may be performed in the compaction module 208.

If compaction is performed on an active block, data in the block is transferred to another block. Accordingly, as in wear leveling, data is rewritten along with the data transfer between the blocks. In other words, if compaction is performed, old data is updated, and wear leveling is not required to be performed on the same block. For this reason, the ID duplication prevention module 231 of the embodiment prevents wear leveling on an active block subjected to compaction.

While an example is described herein in which wear leveling is prevented from being performed on an active block subjected to compaction, compaction may be prevented from being performed on an active block subjected to wear leveling. In this case also, it is possible to prevent data transfer on the same block from being performed twice by wear leveling and compaction.

If an active block to be subjected to wear leveling is determined by the wear-leveling target block determination module 204 without being prevented by the ID duplication prevention module 231, the origin block booking register 206 registers the booking of the active block in the compaction module 208 as a transfer origin block. With this, the block ID of the transfer origin block is registered in a wear-leveling block ID retainer 221 in the compaction module 208.

If an active block to be subjected to wear leveling is determined by the wear-leveling target block determination module 204 without being prevented by the ID duplication prevention module 231, the destination block booking register 205 requests the block management module 207 to register the booking of a transfer destination block for wear leveling. When the block management module 207 receives the booking registration request, the free block management module 212 sets the booking flag in the assignment list 402, and secures a free block with the largest erasure count as a data transfer destination by wear leveling. This prevents a processor other than the compaction module 208 (for example, the controller 202) from writing data to the free block.

While a free block with the largest erasure count is described herein byway of example as a data transfer destination by wear leveling, it is not so limited. Besides, while an example is described herein in which only one free block is booked as a data transfer destination by wear leveling, a plurality of free blocks may be booked. In this case, for example, the destination block booking register 205 books a predetermined number of blocks with a larger erasure count as data transfer destinations by the compaction module 208.

The compaction module 208 comprises a target block controller 223, the compaction block ID retainer 222, and the wear-leveling block ID retainer 221. The compaction module 208 performs compaction on the NAND flash memory 110 trough the NAND I/F 201.

Figure 5:
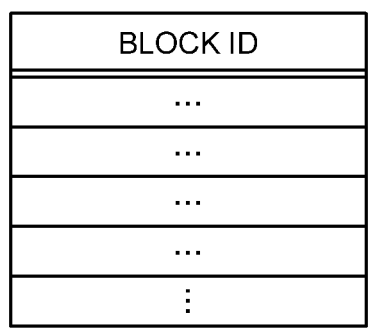
FIG. 5 is an exemplary schematic diagram of the table structure of a compaction block ID retainer in the embodiment.

The compaction block ID retainer 222 retains a block ID that identifies a block to be a transfer origin due to compaction by the target block controller 223. FIG. 5 illustrates an example of the table structure of the compaction block ID retainer 222. As illustrated in FIG. 5, the compaction block ID retainer 222 stores a plurality of IDs of blocks to be subjected to compaction.

Figure 6:
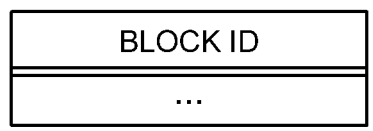
FIG. 6 is an exemplary schematic diagram of the table structure of a wear-leveling block ID retainer in the embodiment.

The wear-leveling block ID retainer 221 retains a block ID that identifies a block the booking of which has been registered by the origin block booking register 206 as a data transfer origin. FIG. 6 illustrates an example of the table structure of the wear-leveling block ID retainer 221. As illustrated in FIG. 6, the wear-leveling block ID retainer 221 stores only one ID of a block to be subjected to wear leveling.

Wear leveling is performed when data stays in the same active block. Accordingly, the wear-leveling determination module 203 determines whether there is one active block to be subjected to wear leveling in a predetermined period of time. Therefore, an example is described herein in which the booking of only one block is registered for wear leveling; however, the booking of a plurality of blocks may be registered. In this case, the table illustrated in FIG. 6 contains a plurality of records, and the booking flag may be set by the free block management module 212 with respect to a plurality of blocks.

The target block controller 223 performs compaction to transfer data stored in blocks of the NAND flash memory 110, thereby collecting the data in a block other than the blocks. Further, if the wear-leveling block ID retainer 221 retains a block ID, the target block controller 223 transfers data stored in a block identified by the block ID (wear leveling). The target block controller 223 of the embodiment uses a free block identified by a block ID fed from the free block management module 212 as a transfer destination.

In the embodiment, if the wear-leveling target block determination module 204 has determined a block on which wear leveling is to be performed, the booking of a transfer origin block and a transfer destination block is registered for wear leveling. After that, if the wear-leveling block ID retainer 221 retains a block ID, the target block controller 223 transfers data stored in a block identified by the block ID to a block identified by a block ID fed from the free block management module 212 (wear leveling) in preference to compaction.

That is, according to the embodiment, the target block controller 223 of the compaction module 208 controls data transfer for compaction. Only in the case where the bookings of a transfer origin block and a transfer destination block have been registered for wear leveling, wear leveling is performed in preference to compaction. With this, it is possible to control data transfer between the transfer origin block and the transfer destination block the bookings of which have been registered separately.

When the target block controller 223 completes wear leveling and the wear-leveling block ID retainer 221 does not retain a block ID, the target block controller 223 switches the operation to compaction. Subsequently, the target block controller 223 transfers valid data stored in a block identified by a block ID retained by the compaction block ID retainer 222 to a block identified by a block ID fed from the free block management module 212.

Having performed data transfer, the target block controller 223 notifies the block management module 207 of it. According to the notification, the block management module 207 changes active blocks managed by the active block management module 211 and free blocks managed by the free block management module 212.

With this configuration, the NAND controller 111 implements the function of transferring data between blocks based on wear leveling as well as compaction.

Figure 7:
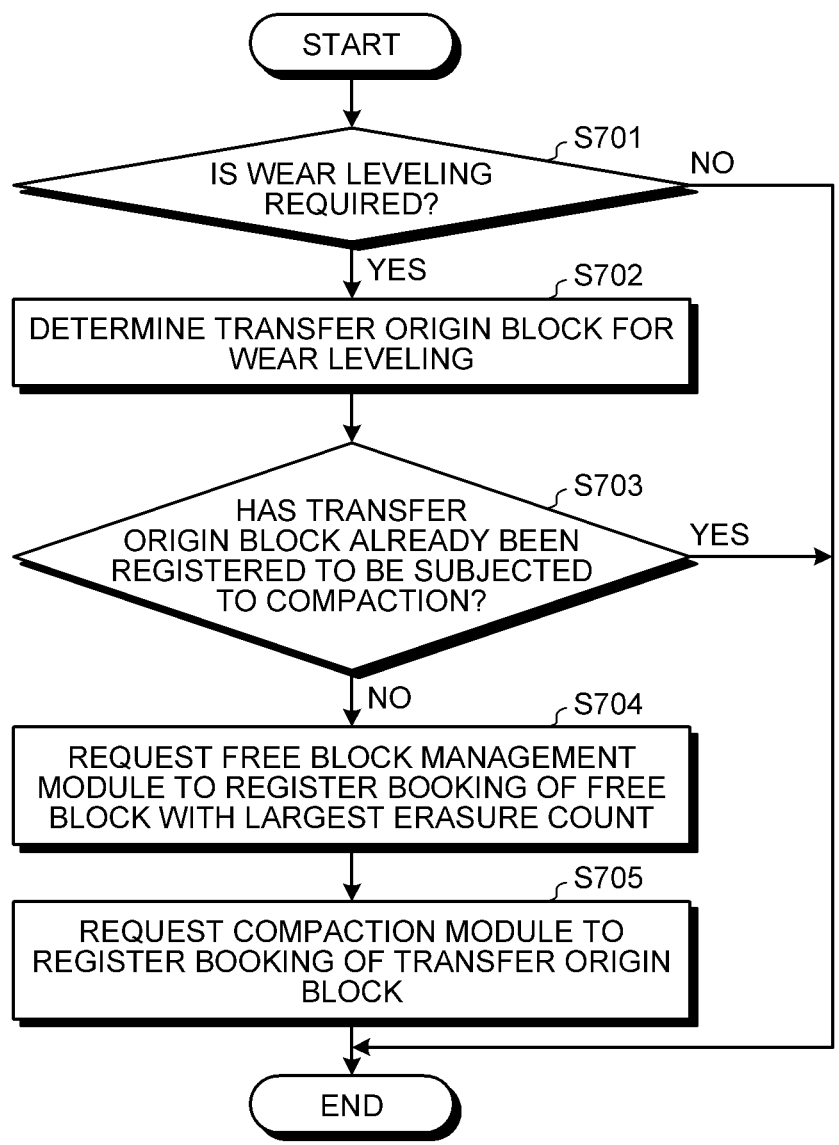
FIG. 7 is an exemplary flowchart of the operation of a NAND controller to register a booking for wear leveling in the embodiment.

In the following, a description will be given of the operation of the NAND controller 111 to register a booking for wear leveling. FIG. 7 is a flowchart of the operation of the NAND controller 111 to register a booking for wear leveling.

First, upon receipt of a request from the controller 202, the wear-leveling determination module 203 refers to the active block management module 211 to determine whether there is a block that requires wear leveling (S701). If the wear-leveling determination module 203 determines that there is no block that requires wear leveling (No at S701), the process ends.

On the other hand, if the wear-leveling determination module 203 determines that there is a block that requires wear leveling (Yes at S701), the wear-leveling target block determination module 204 determines an active block on which wear leveling is to be performed (S702).

Then, the ID duplication prevention module 231 refers to the compaction block ID retainer 222 to determine whether the block ID of the active block determined at S702 has already been registered in the compaction block ID retainer 222 to be subjected to compaction (S703). If the ID duplication prevention module 231 determines that the block ID has already been registered (Yes at S703), the process ends.

On the other hand, if the ID duplication prevention module 231 determines that the block ID has not yet been registered (No at S703), the destination block booking register 205 requests the free block management module 212 to set the booking flag to ON in the assignment list 402 of the free block management module 212 to register the booking of a free block with the largest erasure count (S704).

Further, the origin block booking register 206 registers the booking of the active block determined at S702 in the wear-leveling block ID retainer 221 of the compaction module 208 as a transfer origin block (S705).

With the above process, the settings to perform wear leveling are completed. After that, according to the settings, the compaction module 208 transfers valid data, thereby performing wear leveling.

Figure 8:
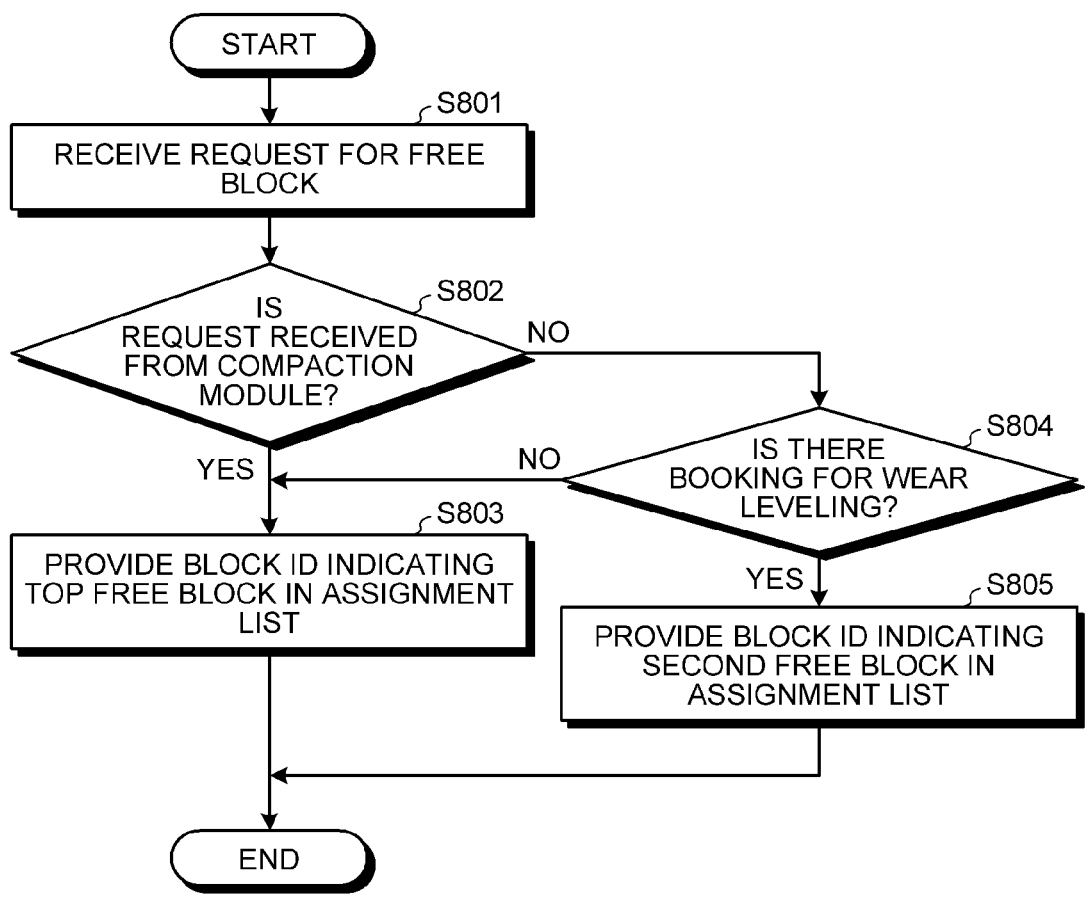
FIG. 8 is an exemplary flowchart of the operation of the free block management module to provide a free block in the embodiment.

A description will then be given of the operation of the free block management module 212 of the NAND controller 111 to provide a free block. FIG. 8 is a flowchart of the operation of the free block management module 212 to provide a free block.

First, the free block management module 212 receives a request for a free block (S801).

The free block management module 212 then determines whether the request is received from the compaction module 208 (S802). If the request is not received from the compaction module 208 but received from another processor such as the controller 202 (No at S802), the free block management module 212 determines whether the booking flag is set to ON in the assignment list 402 (S804). If the booking flag is set to ON in the assignment list 402 (Yes at S804), the free block management module 212 determines that a free block at the top of the assignment list 402 is secured for wear leveling, and provides the other processor such as the controller 202 with a block ID indicating the second free block in the assignment list 402 (S805).

On the other hand, if the booking flag is set to OFF (No at S804), the free block management module 212 determines that no free block is secured for wear leveling, and provides the other processor such as the controller 202 with a block ID indicating the top free block in the assignment list 402 (S803).

If the request is received from the compaction module 208 (Yes at S802), the free block management module 212 provides the compaction module 208 with the block ID indicating the top free block in the assignment list 402 (S803).

With the above process, if the booking flag is set to the top of the assignment list 402, a free block where the booking flag is set is fed to the compaction module 208. The compaction module 208 performs wear leveling in preference to compaction. Thus, data transfer can be performed using the free block where the booking flag is set as a data transfer destination in wear leveling.

Figure 9:
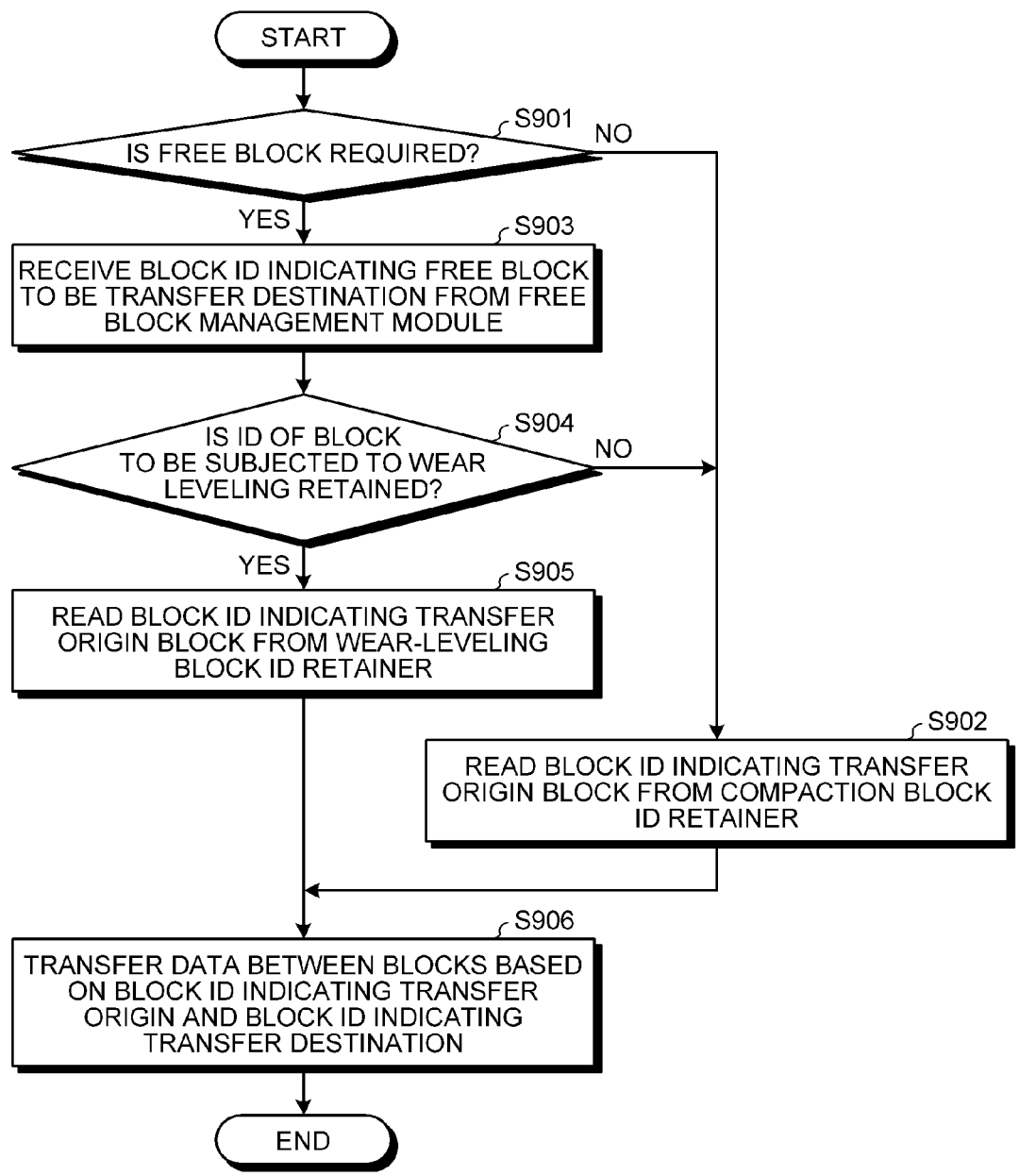
FIG. 9 is an exemplary flowchart of the operation of a target block controller to control data transfer in the embodiment.

Next, a description will be given of the operation of the target block controller 223 of the compaction module 208 to control data transfer. FIG. 9 is a flowchart of the operation of the target block controller 223 to control data transfer.

First, the target block controller 223 determines whether a new free block is required as a transfer destination block in the process of compaction (S901). If a new free block is not required (No at S901), the target block controller 223 reads a block ID indicating a transfer origin block from the compaction block ID retainer 222 (S902).

On the other hand, having determined that a new free block is required (Yes at S901), the target block controller 223 is fed by the free block management module 212 with a block ID indicating a free block to be a transfer destination (S903).

After that, the target block controller 223 refers to the wear-leveling block ID retainer 221 to determine whether the ID of a block to be subjected to wear leveling is retained (S904). Having determined that the ID of a block to be subjected to wear leveling is not retained (No at S904), the target block controller 223 reads a block ID indicating a transfer origin block from the compaction block ID retainer 222 (S902).

On the other hand, having determined that the ID of a block to be subjected to wear leveling is retained (Yes at S904), the target block controller 223 reads a block ID indicating a transfer origin block from the wear-leveling block ID retainer 221 (S905).

The target block controller 223 then transfer data from the block indicated by the block ID read at S905 or S902 as a transfer origin block to the block indicated by the block ID fed as a transfer destination (S906).

With the above process, if the ID of a block to be subjected to wear leveling is retained when a free block is required, wear leveling is performed preferentially.

As described above, according to the embodiment, in the storage device 101, resources related to valid data transfer control are shared between wear leveling and compaction. This reduces development codes as well as improving debug efficiency and quality. Thus, cost reduction can be expected in realizing the device.

According to the embodiment, in the storage device 101, the same block is prevented from being subjected to wear leveling and compaction. This achieves higher overall control efficiency and performance improvement.

With conventional technologies, a configuration to perform wear leveling and that to perform compaction exist independently. As a result, if the same block is to be subjected to both wear leveling and compaction, exclusive control is difficult. On the other hand, according to the embodiment, the compaction module 208 consolidates the management of blocks to be subjected to the processes to avoid duplicated registration of the same block ID. This effectively contributes to higher overall control efficiency and performance improvement.

In the above embodiment, while block IDs are fed from the assignment list 402 in descending order of erasure count, it is not so limited. For example, there may be prepared a plurality of lists using different sort conditions. In this case, the lists are switched from one to another as required to feed a block ID. An example will be described in which a free block management module comprises a plurality of assignment lists as a modification of the embodiment. Otherwise, the storage device 101 is of the same configuration as previously described in the above embodiment, and thus repetitive description will be avoided.

Figure 10:
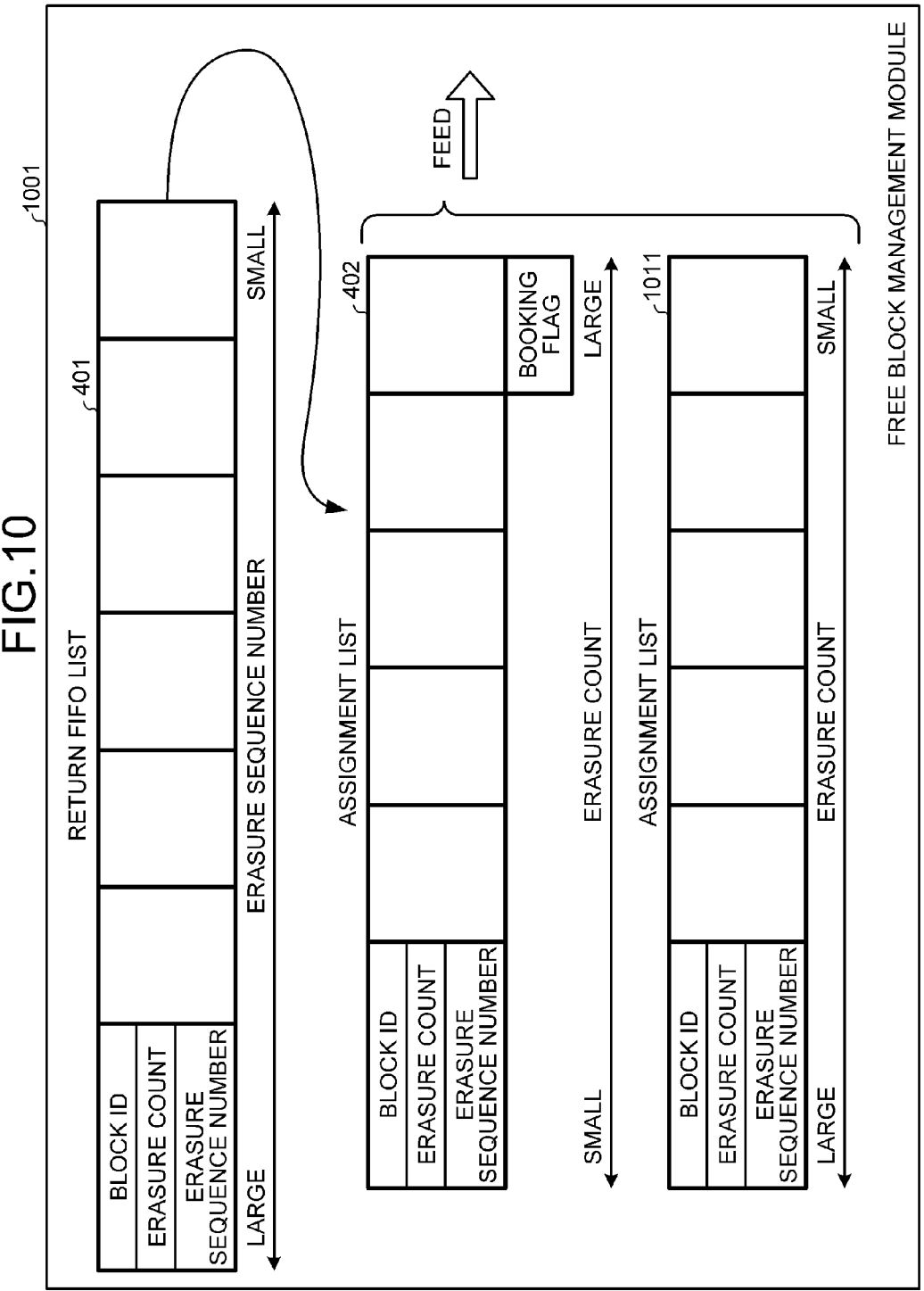
FIG. 10 is an exemplary schematic diagram of the internal structure of a group of tables in a free block management module according to a modification of the embodiment.

FIG. 10 illustrates an example of the internal structure of a group of tables in a free block management module 1001 according to the modification. As illustrated in FIG. 10, the free block management module 1001 comprises the return FIFO list 401, the assignment list 402, and an assignment list 1011.

While the assignment list 1011 is described herein by way of example as arranging free blocks in ascending order of erasure count, it is not so limited. The assignment list 1011 may store free blocks according to another condition.

The free block management module 1001 uses both the assignment lists 402 and 1011 to feed a free block according to the need by the compaction module 208, the controller 202, or the like. For example, when the target block controller 223 performs compaction, the free block management module 1001 may feed the target block controller 223 with a block ID according to a condition other than in descending order of erasure count, i.e., from the assignment list 1011. Besides, upon receipt of a request for a free block from the controller 202, the free block management module 1001 may feed the controller 202 with a block ID always from the assignment list 1011.

With respect to the assignment list, a mechanism may be added to manage another list of blocks which have been booked for wear leveling. This enables receipt of a plurality of requests for wear leveling. In this case, the structure of the assignment list may be simplified without using a booking flag.

The memory control program to control the NAND flash memory 110 may be provided to the NAND controller 111 of the embodiment as being stored in advance in a read only memory (ROM) or the like in the NAND controller 111.

The memory control program may also be provided to the NAND controller 111 as being stored in a computer-readable storage medium, such as a compact disc-read only memory (CD-ROM), a flexible disk (FD), a compact disc recordable (CD-R), and a digital versatile disc (DVD), as a file in an installable or executable format.

The memory control program for the NAND controller 111 of the embodiment comprises modules that implement the above constituent elements (the controller, the wear-leveling determination module, the wear-leveling target block determination module, the destination block booking register, the origin block booking register, the block management module, and the compaction module). As real hardware, the CPU (processor) loads the memory control program from the ROM described above into the main memory and executes it. With this, the controller, the wear-leveling determination module, the wear-leveling target block determination module, the destination block booking register, the origin block booking register, the block management module, and the compaction module are implemented on the main memory.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage controller for a storage comprising a plurality of blocks in units of which data is erased, the blocks configured to store data, the storage controller comprising:
   a condition storage configured to store, with respect to each of the plurality of blocks, block condition information comprising at least one of erasure time information indicative of a latest time of data erasure and erasure count information indicative of a number of times data has been erased from the block;
   a determination module configured to determine whether to perform wear leveling on each of the plurality of blocks, based on the block condition information stored in the condition storage;
   a wear-leveling block retainer configured to retain block identification information indicative of a block identified for wear leveling by the determination module;
   a data transfer controller configured to:
      perform compaction by collecting data stored in at least two blocks of the plurality of blocks and transferring the data into another block; and
      transfer data stored in the block indicated in the block identification information when the wear-leveling block retainer retains block identification information;
   a compaction block retainer configured to retain block identification information indicative of a block to be a transfer origin when the data transfer controller performs compaction; and
   a prevention module configured to prevent the same block identification information from being retained by the wear-leveling block retainer and the compaction block retainer at the same time, wherein
   the data transfer controller is further configured to transfer the data stored in the block indicated in the block identification information retained by the wear-leveling block retainer, and to perform the compaction on blocks indicated in the block identification information retained by the compaction block retainer.

2. The storage controller of claim 1, further comprising a transfer destination retainer configured to retain block identification information indicative of a block to be a transfer destination in the compaction or wear leveling, wherein the block to be a transfer destination is empty, wherein
   the data transfer controller is further configured to transfer the data stored in the block indicated in block identification information to the block indicated in the block identification information retained by the transfer destination retainer.

3. The storage controller of claim 2, wherein
   the transfer destination retainer is further configured to retain the block identification information in association with the erasure count information, and provide the data transfer controller with block identification information in an order starting with block identification information that identifies a block with a largest erasure count, and
   the data transfer controller is configured to transfer the data stored in the block identified by the block identification information to the block indicated in the block identification information provided by the transfer destination retainer in preference to performing compaction, when the wear-leveling block retainer retains the block identification information.

4. The storage controller of claim 3, further comprising a registration module configured to register a block, identified by the determination module for wear leveling, as a destination of data transfer by the data transfer controller in an order starting with a block with a largest erasure count, wherein
   the data transfer controller is further configured to transfer the data stored in the block identified by the block identification information retained by the wear-leveling block retainer to the block registered by the registration module.

5. The storage controller of claim 3, further comprising a controller configured to write data to the blocks of the storage in response to an external request, wherein
   the transfer destination retainer is configured to provide the data transfer controller with the block identification information in an order other than a descending order of erasure count, when the data transfer controller performs the compaction or the controller performs a data write operation.

6. A storage device comprising:
   a storage comprising a plurality of blocks in units of which data is erased, the blocks configured to store data;
   a condition storage configured to store, with respect to each of the plurality of blocks, block condition information comprising at least one of erasure time information indicative of a latest time of erasure and erasure count information indicative of a number of times data has been erased from the block;

a determination module configured to determine whether to perform wear leveling on each of the plurality of blocks, based on the block condition information stored in the condition storage;

a wear-leveling block retainer configured to retain block identification information indicative of a block identified for wear leveling by the determination module;

a data transfer controller configured to:
  perform compaction by collecting data stored in at least two blocks of the plurality of blocks and transferring the data into another block; and
  transfer data stored in the block indicated in the block identification information when the wear-leveling block retainer retains block identification information;

a compaction block retainer configured to retain block identification information indicative of a block to be a transfer origin when the data transfer controller performs compaction; and a prevention module configured to prevent the same block identification information from being retained by the wear-leveling block retainer and the compaction block retainer at the same time, wherein the data transfer controller is further configured to transfer the data stored in the block indicated in the block identification information retained by the wear-leveling block retainer, and to perform the compaction on blocks indicated in the block identification information retained by the compaction block retainer.

7. A data transfer control method for a storage device comprising a condition storage in a storage with a plurality of blocks in units of which data is erased, the condition storage configured to store, with respect to each of the plurality of blocks, block condition information comprising at least one of erasure time information indicative of a latest time of data erasure and erasure count information indicative of a number of times data has been erased from the block, the data transfer control method comprising:

determining, by a determination module, a block upon which to perform wear leveling, based on the block condition information stored in the condition storage;

retaining, by a wear-leveling block retainer, block identification information indicative of the block determined by the determination module for wear leveling;

compacting, by a data transfer controller, by collecting data stored in at least two blocks of the storage and transferring the data in to another block;

transferring, by the data transfer controller, data stored in the block identified by the block identification information when the wear-leveling block retainer retains the block identification information;

retaining, by a compaction block retainer, block identification information indicative of a block to be a transfer origin in the compaction performed by the data transfer controller; and preventing, by a prevention module, the same block identification information from being retained by the wear-leveling block retainer and the compaction block retainer at the same time; and transferring the data stored in the block identified by the block identification information retained by the wear-leveling block retainer, wherein said compacting comprises collecting data stored in at least two blocks identified by the block identification information retained by the compaction block retainer and transferring the data in to another block.

8. The data transfer control method of claim 7, further comprising:

retaining, by a transfer destination retainer, block identification information indicative of a block to be a transfer destination during compaction or wear leveling, wherein the block to be a transfer destination is empty; and transferring the data stored in the block indicated in block identification information to the block indicated in the block identification information retained by the transfer destination retainer.

* * * * *